United States Patent [19]

Brugger

[11] 4,037,652
[45] July 26, 1977

[54] SOLAR HEAT STORAGE SYSTEM

[76] Inventor: Hans Brugger, Gran View 9-W, Nyack, N.Y. 10960

[21] Appl. No.: 653,701

[22] Filed: Jan. 30, 1976

[51] Int. Cl.² .............................................. F28D 21/00
[52] U.S. Cl. ...................................... 165/45; 202/234; 126/271
[58] Field of Search ............... 165/45; 126/271, 271.1, 126/400; 159/1 S; 202/234; 237/1 A

[56] References Cited

U.S. PATENT DOCUMENTS

| 2,396,338 | 3/1946 | Newton | 126/271 X |
| 2,469,496 | 5/1949 | Christenson | 126/271 X |
| 2,969,637 | 1/1961 | Rowekamb | 202/234 UX |
| 3,390,672 | 7/1968 | Snelling | 126/271 |
| 3,931,806 | 1/1976 | Hayes | 126/400 |

Primary Examiner—Carroll B. Dority, Jr.
Assistant Examiner—Theophil W. Streule, Jr.
Attorney, Agent, or Firm—Eugene Lieberstein

[57] ABSTRACT

A solar heat storage system including in combination a liquid vessel for storing solar energy and solar heat collection means comprising a network of serially connected conductive conduits arranged in a serpentine fashion and coupled to a source of antifreeze in a closed loop, said plurality of conduits lying below street level and covered by a layer of blacktop.

7 Claims, 5 Drawing Figures

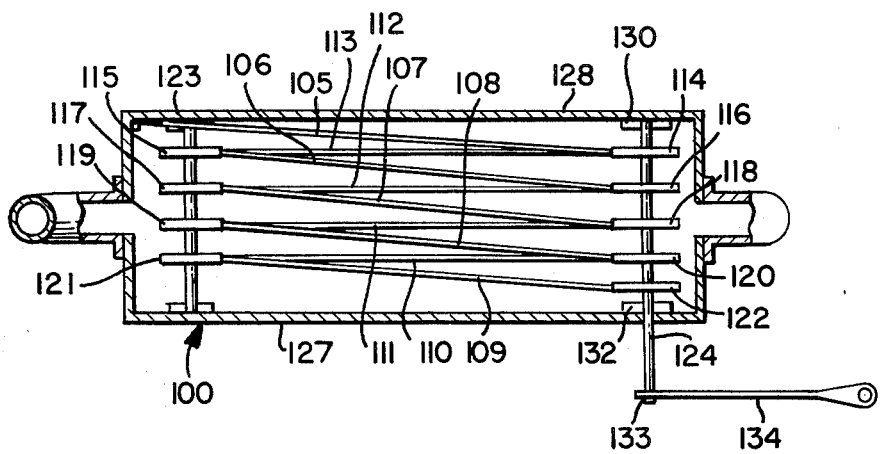
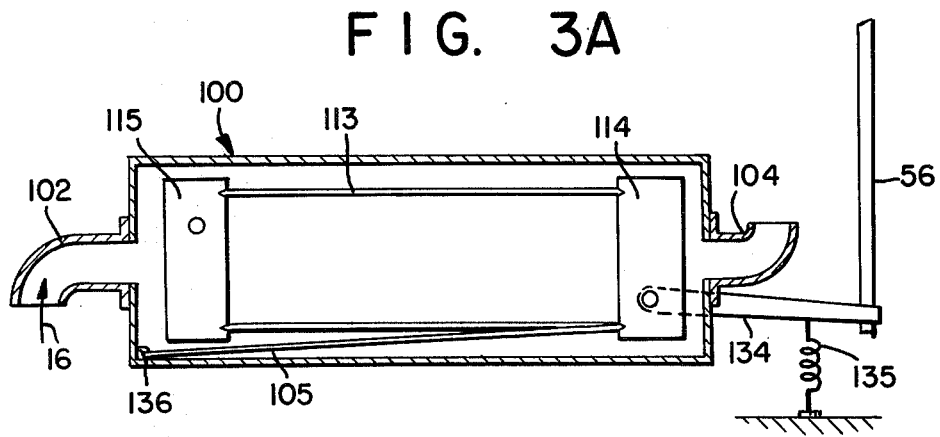
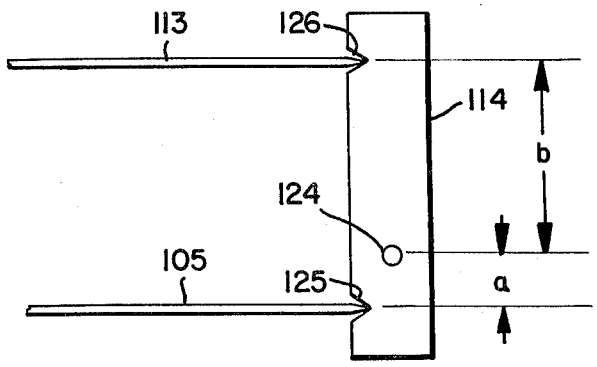

SOLAR HEAT STORAGE SYSTEM

This invention relates to a solar heat storage system for a house which is simple, very low in construction cost and of long life.

Solar heat storage systems are receiving much more attention today in light of the substantial increase in the cost of energy. Basic to all solar heating systems is a collector of solar energy, a storage facility for accumulating the collected energy and means for distributing the stored energy from the accumulator to the point of use. The solar heat collector is almost invariably a structure integrated into or mounted upon the roof of the house and in an appropriate location for maximum exposure to the sun. This usually involves an expensive undertaking. Moreover, because the collector is on the roof of the house it is exposed to inclement weather and is subject to damage. Its location on the roof is necessarily above the location of the storage facility requiring the assistance of a pump at all times when circulating the motive fluid from the collector to the accumulator. Most conventional systems using a roof top collector are not only expensive to install but may also be expensive to maintain offsetting the advantages derived from minimal energy savings. Accordingly, it is the principle object of the present invention to provide a solar heat storage system by which solar energy can be collected during sunlight hours for immediate use at such time or for use at a later time and which is economical to install, relatively maintenance free and not subject to weather conditions.

Other objects and advantages of the present invention will become apparent from the following detailed description when taken in connection with the accompanying drawings in which:

FIG. 3a is a plan view of an alternative thermal sensor compartment for the regulator of FIG. 2;

FIG. 3b is a side elevation of the thermal compartment of FIG. 3; and

FIG. 3c is an enlarged view of one of the levers of FIGS. 3a and 3b.

Figure 1:
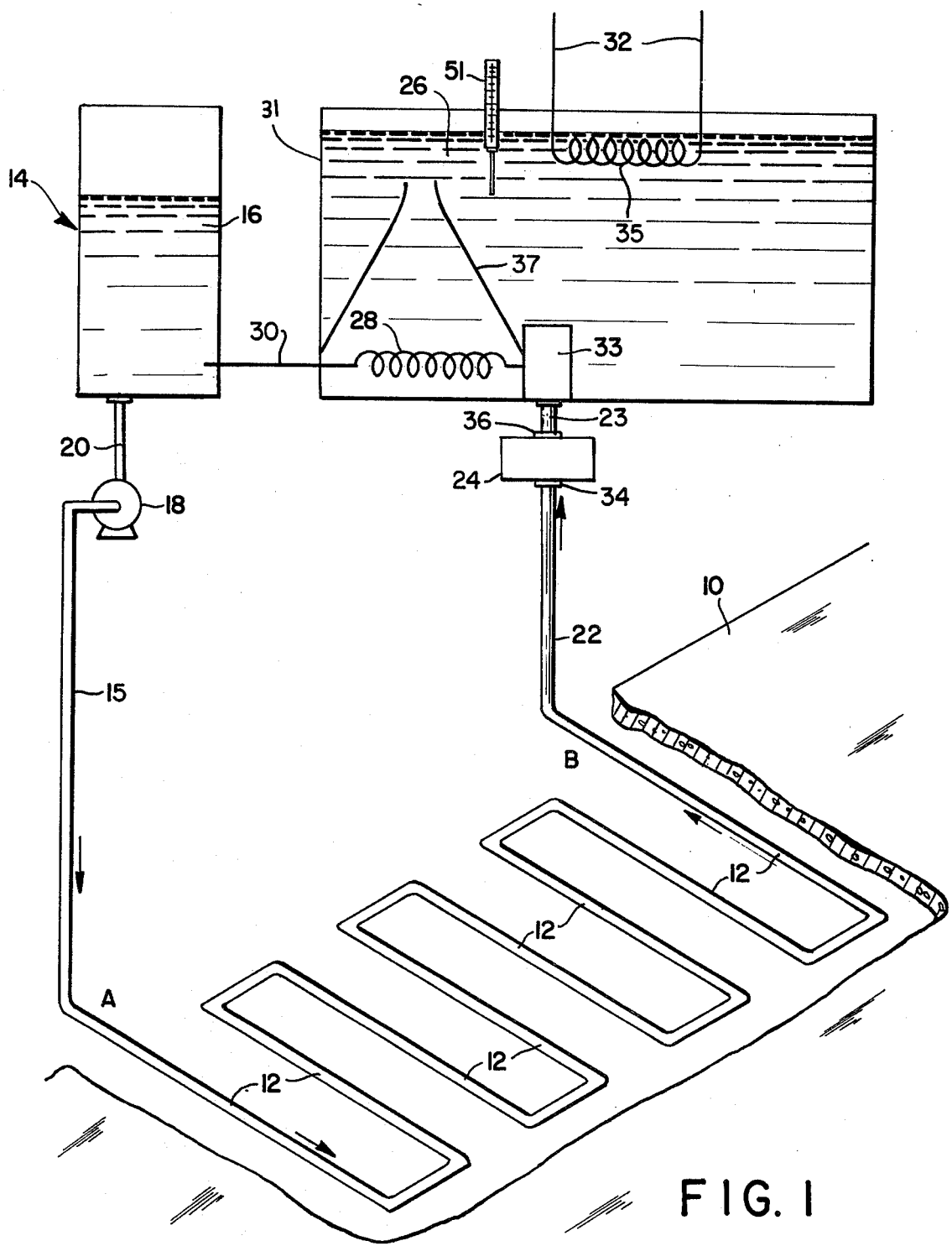
FIG. 1 is a schematic representation of the solar heat storage system of the present invention.

The present invention advantageously employs the "blacktop" surface of a driveway associated with a house or a conventional blacktop street surface lying adjacent a house as part and parcel of the solar water heating system. "Blacktop" for purposes of the present invention is intended to mean a conventional petroleum derived oil and tar composition or alternatively an asphalt based coating. Blacktop is naturally black and solar heat absorptive in character. The blacktop surface 10, as exemplified in FIG. 1 of the drawings, forms an overlayment for a plurality of heat conductive pipes 12 preferably of copper. The pipes 12 are intended to be laid down either before the blacktop is deposited thereover to form the driveway or street or may be mounted over an older driveway or street to be recovered in which case the pipes will be located intermediate the layers of blacktop. When a new driveway or street is being formed it is preferred that an initial insulating medium of any conventional insulating material composition be deposited on the ground prior to the assemblage of heat conductive pipes 12.

The heat conductive pipes 12 are arranged in a zigzag fashion along a common plane located directly beneath the blacktop street overlayment but preferably at an inclined angle such that each section of pipeline starting from point A, representing the beginning of the network, gradually rises with respect to each preceding section of pipeline up to point B representing the end of the network of pipes 12. The number of conductive pipes in the network, their length, diameter and their alignment will depend upon the climate, the orientation of the driveway or the street under which the pipes are located and the surface area covered by the network of pipes 12.

A motive fluid 16 is supplied from an expansion tank 14 to the network of pipes 12 through a supply pipeline 15 and an auxiliary pump 18. The auxiliary pump 18 is connected to the expansion tank 14 by a connecting pipe 20. The motive fluid 16 is controllably recirculated from the expansion tank 14 through the pipe network 12 and back in a closed loop. The return path from point B of the pipe network 12 to tank 14 is formed through pipeline conduit 22, solar heat collector panel 24, connecting pipe 23, regulator 33, heat exchanger 28, and return pipe 30. The motive fluid 16 is preferably a liquid solution which is not susceptible to freezing during periods of cold weather such as a conventional antifreeze, i.e., ethylene glycol.

The expansion tank 14 permits changes in the volume of the liquid solution 16 with changes in temperature and is preferably located at the highest point in the circulation system so that the liquid solution 16 may be allowed to freely circulate without assistance from pump 18 at least during periods of sunshine. The use of an auxiliary pump 18 is, however, preferred for increasing the circulation of the liquid solution 16 through the network of pipes 12. Pump 18 is conventional and preferably of the impeller type so that the liquid 16 may travel through the pump 18 without resistance even when the pump is not operating. The pump 18 is controlled by a motor M which is in turn controlled by the regulator 33 in a manner to be explained hereafter in connection with FIG. 2.

The heat absorbed by the liquid antifreeze solution 16 is transferred to a storage vessel 31 containing a liquid medium 26 such as water. The stored energy may then be retransmitted to the ultimate point of use. Intermediate the storage vessel 31 and the network of pipes 12 is preferably an auxiliary solar heat collector panel 24. The solar collector panel 24 is a conventional and commercially available unit of the flat plate type which typically includes a frame metal housing, usually of rectangular construction, with a back portion of insulating material and a covering of glass or plastic. Inside the frame housing is usually a looped series of interconnecting tubing with an inlet and outlet connection 34 and 36 respectively. Between the glass or plastic covering and the tubing is a black heat collecting metal plate surface for absorption of solar energy. The manner in which solar heat collectors of this type operate is well known. It is also well known that the glass covering being substantially opaque to longer wavelength radiation from the heat collecting black surface out of the collector panel 24 causes a "greenhouse" effect which permits the liquid temperature in the tubing of the solar panel to increase to higher levels than would otherwise be attainable without the covering. It is to be understood, however, that the present invention does not require the use of a supplementary collector panel 24. Stated otherwise the additional incorporation of a solar panel 24 will depend upon climate conditions, the application of the system and the required control temperature of the storage vessel. Without supplementary heating from the solar panel 24 the liquid solution 16 will pass directly into the heat exchanger 28 under the control of regulator 33. The solar panel 24 is incorporated into the circulation system simply by coupling line 22 to the inlet 34 of the solar panel 24 and connecting the outlet opening 36 of the solar panel 24 to connecting pipe 23. The liquid solution 16 will then circulate first through the network of pipes 12 and then through the solar collector panel 24 before being passed through the heat exchanger 28 and returned to expansion tank 14. The positioning of the solar panel 24 should naturally be such as to maximize its exposure to the sun. Accordingly, when a higher storage temperature is necessary the supplementary solar collector panel is incorporated into the system.

Circulation of the liquid solution 16 is governed by regulator 33 which permits circulation only during such periods when the temperature of the solution 16 is higher than the ambient temperature of the liquid 26 in the storage vessel 31. The heat exchanger 28 may be any conventional heat exchanger which in the simplest form would be a coiled pipe interconnected in series with the circulation system. The stored heat energy in the storage vessel 31 may be transmitted to, e.g., the hot water heater of a house by a second heat exchanger 35 through a pair of hot water supply lines 32. A covering 37 preferably frusto-conical in shape may be placed in the storage vessel 31 about the heat exchanger 28 to speed up the thermal exchange with the liquid 26 at the upper end of the storage vessel 31.

The storage vessel 31 may be located at street level although it should preferably be placed above street level and should, of course, be well insulated. If the auxiliary solar heat collector panel 24 is used, the storage vessel must be above the location of the panel 24 in order to minimize the use of pump 18.

Figure 2:
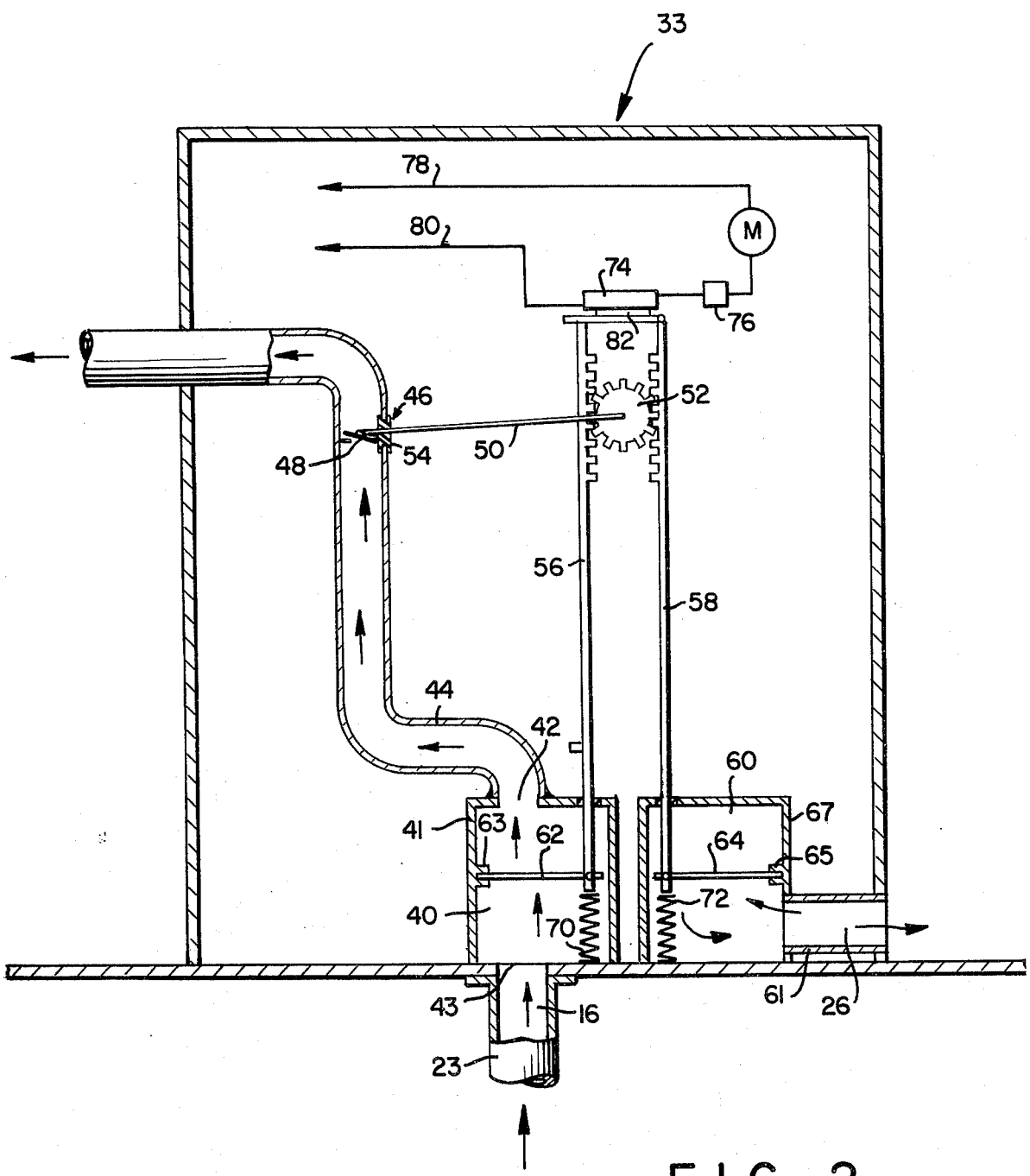
FIG. 2 is a detailed schematic of the control regulator shown in FIG. 1 for limiting circulation in the system to such periods of time when heat can be transferred to the storage vessel.

Regulator 33 which controls the circulation of the liquid antifreeze solution 16 is shown in detail in FIG. 2. The liquid solution 16 passes from the connecting pipe 23 into an enclosed compartment 40 which communicates through an opening 42 to a conduit 44 and through an opening 43 to pipe 23. Conduit 44 is in turn coupled to the heat exchanger 28 in the storage vessel 31. Similarly, the tank fluid 26 circulates in compartment 60 entering through the connecting pipe 61 from which the fluid 26 may also exit; although for better circulation there should be more than one connecting pipe.

A valve assembly 46 controls the passage of the liquid solution 16 from compartment 40 through conduit 44. It is to be understood that the invention is not to be limited to any specific valve construction. The valve assembly 46 includes an adjustable valve member 48 which is hinged to a rod 50 connected through a seal 54 to a gear mechanism 52. The seal 54 is of a flexible material so as to permit minor vertical movements in the rod 50. Rotation of the gear 52 causes linear reciprocation of the rod 50 for adjustably opening or closing the valve member 48. Valve member 48 is intended to open with clockwise rotation of gear 52 and is intended to close with counterclockwise rotation of gear 52.

The gear 52 is intercoupled to a rack 56 on one side and to a rack 58 on its opposite side. Rack 56 extends into compartment 40 and is pivotally coupled to a conventional bimetallic member 62. Likewise, the rack 58 extends into compartment 60 and is pivotally coupled to a substantially identical bimetallic member 64. A bimetallic member is composed of any two metals having substantially different thermal expansion characteristics. The bimetallic member 62 is fastened to a bracket 63 which extends from the wall 41 of compartment 40. The compartment 40 may have slots at incremented locations along the wall 41 to permit adjustment of the height of the member 62 relative to the corresponding bimetallic member 64 in compartment 60. The bimetallic member 64 is fastened to a bracket 65 which extends from the wall portion 67 of compartment 60 in a manner similar to member 62. The bimetallic members 62 and 64 are arranged in compartments 40 and 60 respectively such that each will deflect upward in response to a rise in respective compartment temperature and downward in response to a decrease in compartment temperature. A spring 70 in compartment 40 will minimize the downward deflection of member 62 whereas spring 72 in compartment 60 will minimize the downward deflection of member 64.

A switch 74, preferably a mercury switch, is electrically connected in a series circuit relation with a timer 76, the pump motor M and through conductors 78 and 80 to a conventional source of electrical energy. The switch 74 has a switch bar 82 which is pivotally connected at one end to rack 58 and is free at the opposite end. Movement of the free end of switch bar 82 controls actuation of the switch 74. When the rack 56 rises relative to rack 58 the switch 74 is actuated and the electrical circuit for energizing the pump motor M is closed. Once the electrical circuit is closed the timer T will vary the on-off time of the motor M.

In operation when the temperature of the liquid solution 16 rises above the temperature of the liquid medium 26 regulator 33 permits antifreeze solution 16 to circulate throughout the system. In addition the regulator 33 controls the energization and deenergization of the motor M. When the temperature of the liquid medium 26 rises to the temperature of the antifreeze solution 16, regulator 33 disables the switch 74 and deenergizes the motor M. Regulator 33 always requires a slight differential in temperature between solution 16 and medium 26 before circulation is permitted. The differential is established by the relative positions between rack 56 and rack 58. Rack 56 rises with an increase in the temperature within compartment 40 relative to the temperature in compartment 60 which results from increasing exposure of the network of pipes 12 and the supplementary solar collector panel 24 to the rays of the sun. Regulator 33 will permit circulation of the antifreeze solution 16 to continue for so long as the temperature of the antifreeze solution 16 is above the temperature of the liquid medium 26 in storage vessel 31. If the temperature of the antifreeze solution 16 should fall the rack 56 will recede due to the downward deflection of member 62. The spring 70 will prevent the rack 56 from moving too far downward. The downward movement of the rack 56 relative to the rack 58 will open switch 74 which will deenergize motor M and pump 18. Such relative downward movement will also cause a counterclockwise rotation which will operate to close off valve member 48. With valve member 48 closed, circulation of the antifreeze solution 16 is halted. Accordingly, only when the temperature of the liquid antifreeze 16 is above the temperature of the liquid medium 26 will circulation be permitted.

The bimetallic members within the compartments 40 and 60 serve as the thermal sensors respectively for the control regulator 33. An alternative thermal sensor arrangement for operating the valve assembly 46 within the control regulator 33 is shown in FIGS. 3(a–c). Both compartments 40 and 60, which are identical to one another, are replaced by a pair of equivalent compartments 100 only one of which is shown in FIGS. 3a and 3b. The operation of the control regulator 33 as taught in connection with FIG. 2 remains the same.

The compartment 100 may lie within the regulator 33 level with the bottom of the tank 31. It is of generally rectangular construction and includes an inlet pipe 102 for receiving the liquid solution 16 from the external connecting pipe 23 and an outlet pipe 104 for connection to the conduit 44 within regulator 33. The counterpart equivalent to compartment 100 which is not shown will receive and exhaust the liquid 26 from tank 31 in a similar manner.

A plurality of high thermal expansion metal rods 105–113 respectively are arranged in compartment 100 with each engaging one of a series of levers 114–122 respectively. The levers with the exception of lever 122 are all rotatably mounted in tandum on shafts 123 and 124 and separated by a substantially equal distance from one another. Lever 122 is fixedly connected through a pin connection 150 to shaft 124. The shaft 123 is fixedly connected between the two outer walls 127 and 128 of compartment 100 whereas the shaft 124 is journaled within bearings 130 and 132 connected to the opposite outer walls 127 and 128 of compartment 100. The shaft 124 extends through the outer wall 127 of compartment 100 and is fixedly connected through a pin connection 133 to the handle 134. The handle 134 is in turn connected to the rack 56 of FIG. 2. A tension spring 135 biases the handle 134 toward a wall surface (not shown) of regulator 33.

Each end of each rod 106–113 respectively and one end of rod 105 extends into a corresponding knife-edged slot provided in each of the levers 114–122. FIG. 3c shows the connection at one end between the two rods 105 and 113 and the illustrative knife-edge slots 125 and 126 respectively in lever 114. The opposite end 136 of rod 105 is affixed to compartment 100 in a predetermined corner location.

The compartment 100 should be of a material having a very low heat expansion coefficient. The rods 105–113 as indicated earlier should have a high thermal expansion capability. A preferred metal for the rods 105–113 would be aluminum or cadmium.

In operation, when the temperature of the liquid solution 16 circulating in compartment 100 rises or drops the rods 105–113 will respond by expanding or contracting respectively. The expansion of each rod bears on a corresponding lever to produce a cumulative rotational force upon shaft 124. For example, rod 105 upon expansion, will push against the lever 114 so as to turn the lever 114 about the shaft 124. The shaft 124 is located a distance $a$ from the slot 125 and a distance $b$ from slot 126 with distance $b$ being substantially greater than the distance $a$. This transfers an even large translational force to rod 113. As stated earlier, all of the levers 114, 116, 118 and 120 and also all of the levers 115, 117, 119 and 121 are free to turn about their respective shafts 124 and 123 respectively with the exception of the last lever 122 which is affixed to shaft 124. The force applied to rod 113 is reapplied to lever 115. This force is composed of both the force applied from lever 114 in combination with a force due to its own expansion. The resultant force applied from the combination of the expansion of each rod and the force applied by each lever is cumulative thereby developing a rotational force upon shaft 124 sufficient to force the handle 134 against the action of the spring 135 in a direction to cause a linear translational movement of rack 56. The rotational force developed on the shaft 124 will determine the distance moved by the rack 56. This force is proportional to the number of rod and lever combinations used in compartment 100. The greater the force the more sensitive the system to temperature variations. In a similar manner, the rack 58 of regulator 33 in FIG. 2 will also be moved by the identical counterpart to compartment 100 (not shown) in response to temperature changes in liquid 26.

What is claimed is:

1. A solar heat storage system for a building including in combination a storage vessel containing a liquid medium for storing solar energy and solar heat collection means, said solar heat collection means comprising:
    an expansion tank located above street level for housing a predetermined heat transfer liquid adapted to absorb solar energy;
    a network of conductive conduits serially connected and arranged below street level in a serpentine fashion along a common plane disposed in an inclined position with respect to the street level such that each conductive conduit rises to a higher level relative to each preceding conductive conduit;
    means coupling said network of conduits to said expansion tank and to said vessel for forming a closed circulation loop for said predetermined heat transfer liquid;
    an overlayment of blacktop located above said network of conduits; and
    heat exchange means communicating between said network of conduits and said storage vessel for transferring heat from said predetermined liquid to said liquid medium.

2. A solar heat storage system as defined in claim 1 wherein said predetermined liquid comprises an antifreeze solution.

3. A solar heat storage system as defined in claim 2 further comprising means for controlling the circulation of said antifreeze solution in said closed circulation loop such that said antifreeze solution flows only when its temperature exceeds the temperature of said liquid medium.

4. A solar heat storage system as defined in claim 3 wherein said control means comprises valve means for controlling the flow of said antifreeze solution; means for sensing the temperature of said antifreeze solution; means for sensing the temperature of said liquid medium in said vessel, and means responsive to the difference in temperature between said liquid medium and said antifreeze for operating said valve means.

5. A solar heat storage system as defined in claim 4 further comprising means for pumping said antifreeze solution, switch means for actuating said pumping means when the temperature of said antifreeze solution exceeds the temperature of said liquid medium and for deenergizing said pumping means when the temperature of said antifreeze solution drops below the temperature of said liquid medium and timing means for enabling and disabling said pumping means during the period of actuation of said valve means.

6. A solar heat storage system as defined in claim 3 further comprising a supplementary solar heat collecting means intercoupled in said closed circulation loop.

7. A solar heat storage system as defined in claim 4 wherein said means for operating said valve means comprises: a first compartment; first conduit means for passing said antifreeze solution through said first compartment; a first multiplicity of thermal expansion rods arranged in said first compartment for cumulatively responding to a temperature variation in said antifreeze solution; a second compartment; second conduit means for passing said liquid means in said second compartment; a second multiplicity of thermal expansion rods arranged in said second compartment for cumulatively responding to a temperature variation in said liquid medium; and means responsive to the difference in expansion between said first multiplicity of thermal expansion rods and said second multiplicity of thermal expansion rods for opening and closing said valve means respectively.

* * * * *